(12) United States Patent
Devos et al.

(10) Patent No.: US 12,095,391 B2
(45) Date of Patent: Sep. 17, 2024

(54) MOTOR SOFT-STARTER CONTROL

(71) Applicant: Schneider Toshiba Inverter Europe SAS, Pacy sur Eure (FR)

(72) Inventors: Thomas Devos, Carrières sous Poissy (FR); François Malrait, Jouy sur Eure (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 0 days.

(21) Appl. No.: 17/549,948

(22) Filed: Dec. 14, 2021

(65) Prior Publication Data
US 2022/0200489 A1 Jun. 23, 2022

(30) Foreign Application Priority Data

Dec. 23, 2020 (EP) .................................... 20306690

(51) Int. Cl.
*H02P 1/02* (2006.01)
(52) U.S. Cl.
CPC .................................. *H02P 1/026* (2013.01)
(58) Field of Classification Search
CPC ..................................................... H02P 1/026
USPC ........................................................ 318/484
See application file for complete search history.

(56) References Cited

U.S. PATENT DOCUMENTS

| | | | | |
|---|---|---|---|---|
| 4,453,122 A * | 6/1984 | Johnson | .................... | H02J 3/26 318/808 |
| 5,565,753 A * | 10/1996 | Chen | ...................... | H02P 27/02 318/809 |
| 6,803,741 B2 * | 10/2004 | Messersmith | .......... | H02P 27/16 318/729 |
| 2002/0093774 A1* | 7/2002 | Chung | ................... | H02P 25/04 323/901 |
| 2010/0156205 A1* | 6/2010 | Davis | .................... | H02K 19/06 310/46 |
| 2019/0190267 A1* | 6/2019 | Cabaussel | ................ | H02J 3/26 |

FOREIGN PATENT DOCUMENTS

| | | | |
|---|---|---|---|
| CA | 2578109 A1 * | 3/2006 | |
| EP | 1037373 A2 | 9/2000 | |
| JP | 2001268958 A | 9/2001 | |
| JP | 2009303323 A | 12/2009 | |

OTHER PUBLICATIONS

System and Method for controlling total electrical power across multiple furnaces (Year: 2006).*
European Search Report and Search Opinion dated May 27, 2021 for corresponding European Patent Application No. EP20306690.7, 6 pages.

\* cited by examiner

*Primary Examiner* — Kawing Chan
(74) *Attorney, Agent, or Firm* — Locke Lord LLP; Judy R. Naamat; Peter N. Fill

(57) ABSTRACT

Examples include a method for controlling a motor soft-starter for starting an electric motor on a three-phases electric network in order to compensate a misbalance between the windings of the electric motor due to a misbalance between the phases of the electric network.

16 Claims, 4 Drawing Sheets

MOTOR SOFT-STARTER CONTROL

FIELD OF THE INVENTION

This invention relates to a method for controlling a motor soft-starter for starting an electric motor.

BACKGROUND

Numerous electric motors connected to an electric network are started by soft starters. Soft starters progressively raise the voltage of an electric motor at the start of the electric motor in order to limit the current running through the electric motor during the starting phase. Hence, a soft starter allows, among other things, smoothly starting the electric motor, raising its speed progressively and reducing inrush currents and mechanical damage during the electric motor starting phase. It is however desirable to improve the control of soft-starters in order to refine the above effects.

SUMMARY

An object of the present disclosure is to propose a method for controlling a motor soft-starter for starting an electric motor on a three-phases electric network in order to reduce or compensate a misbalance between the three phases of the electric network.

For reaching this object, the present disclosure presents a method for controlling a motor soft-starter for starting an electric motor on a three-phases electric network, the soft-starter comprising three arms, each arm comprising two thyristors in antiparallel configuration and connecting a respective phase of the electric network to a respective winding of the electric motor, the method comprising:

determining a misbalance between the three phases of the electric network;

computing a first firing angle for the thyristors of a first arm of the three arms based on the determined misbalance between the three phases; and applying a trigger pulse on a specific thyristor of the specific arm at the first firing angle.

By computing a first firing angle for the thyristors of a first arm based on a misbalance between the three phases of the electric network, the soft-starter can reduce a misbalance between the transmitted currents of electric network to the electric motor. Hence, a control of the soft-starter taking account the misbalance in the electric network improves the control of the electric motor at the start.

Optionally, the misbalance comprises one or more of a phase and an amplitude misbalance between the three phases of the electric network. The phase and the amplitude allow determining a transmitted electric signal between each of the arms of the soft-starter to the electric motor and therefore allows computing the first firing angle such that the electric signal transmitted by the first arm is substantially equal to the one transmitted by at least another arm. The transmitted electric signal may comprise a transmitted current and/or a transmitted voltage.

Optionally, computing a first firing angle for the thyristors of a first arm based on a misbalance of the three phases comprises computing a first firing angle such that a current applied to the electric motor by the first arm is significantly the same as a current applied by at least another arm during a half-period of the electric network. By half period of the electric network, it should be understood in the present disclosure a half-period of each of the three phases. This allows controlling a current misbalance of the electric network at each half-period of each of the three arms. Hence, the misbalance may be compensated at each trigger pulse of the thyristors.

Optionally, the trigger pulse is also applied to the other thyristor of the first arm at the first firing angle. This allows controlling both thyristors of a same arm without taking account a sign of a current of the electric network in the arm.

Optionally, the first firing angle is also computed based on an estimated torque of the electric motor. This allows controlling the soft-starter based on an estimated torque in the electric motor.

Optionally, the first firing angle is also computed based on an estimated current of the electric motor. This allows controlling the soft-starter based on an estimated current in the electric motor.

Optionally, the specific thyristor of the first arm is determined based on a sign of a current of the electric network. This allows controlling the thyristors of a same arm one by one and therefore reducing the wear and tear of each thyristor by reducing the number of applied trigger pulses.

Optionally, a second firing angle is computed for the thyristors of a second arm and a third firing angle is computed for the thyristors of a third arm of the soft-starter, at least two of the firing angles being computed based on the misbalance between the three phases. This allows compensating the misbalance between the three phases in each arm for improving the control of the electric motor.

Optionally, the first, second and third firing angles are computed such that an integral of a voltage signal applied from each of the respective arms of the soft-starter to each of the respective windings of the electric motor is substantially equal across the three arms. This allows transmitting the same transmitted voltage or a similar transmitted voltage to the electric motor in each arm of the soft-starter without measuring any electric motor currents.

Optionally, a firing angle corresponds to an angle delay from an angle where the current or the voltage of the electric network becomes equal to zero. This allows controlling the motor soft-starter based on a α command, that is, by supplying the gate of a thyristor with a delay corresponding to the angle α and following a zero-voltage angle of the corresponding phase voltage or based on a γ command, that is, by supplying the gate of the thyristor with a delay corresponding to the angle γ and following the zero-current angle of the corresponding phase current.

Optionally, the misbalance comprises a voltage misbalance between the three phases of the electric network which is estimated based on voltage measurements on each of the three-phases of the electric network. This allows avoiding measurements of the currents in each winding of the motor.

Optionally, the misbalance comprises a current misbalance between the three windings of the electric motor which is estimated based on current measurements on each of the three windings of the electric motor. This allows avoiding estimating a voltage in the electric network.

Optionally, the current misbalance is determined based on a root mean square current of each of the three windings. The root mean square current directly characterizes the transmitted current from each of the arms to the electric motor and therefore allows compensating the misbalances between the phases of the electric network.

The present disclosure also presents a computer-readable storage medium comprising instructions which, when executed by a processor, cause the processor to carry out one of the methods presented hereby. The processor may be embedded in a soft-starter.

DETAILED DESCRIPTION

The disclosure applies to a method for controlling a motor soft-starter for starting an electric motor. An example of an electric circuit where the method could be applied is illustrated in FIG. 1.

Figure 1:
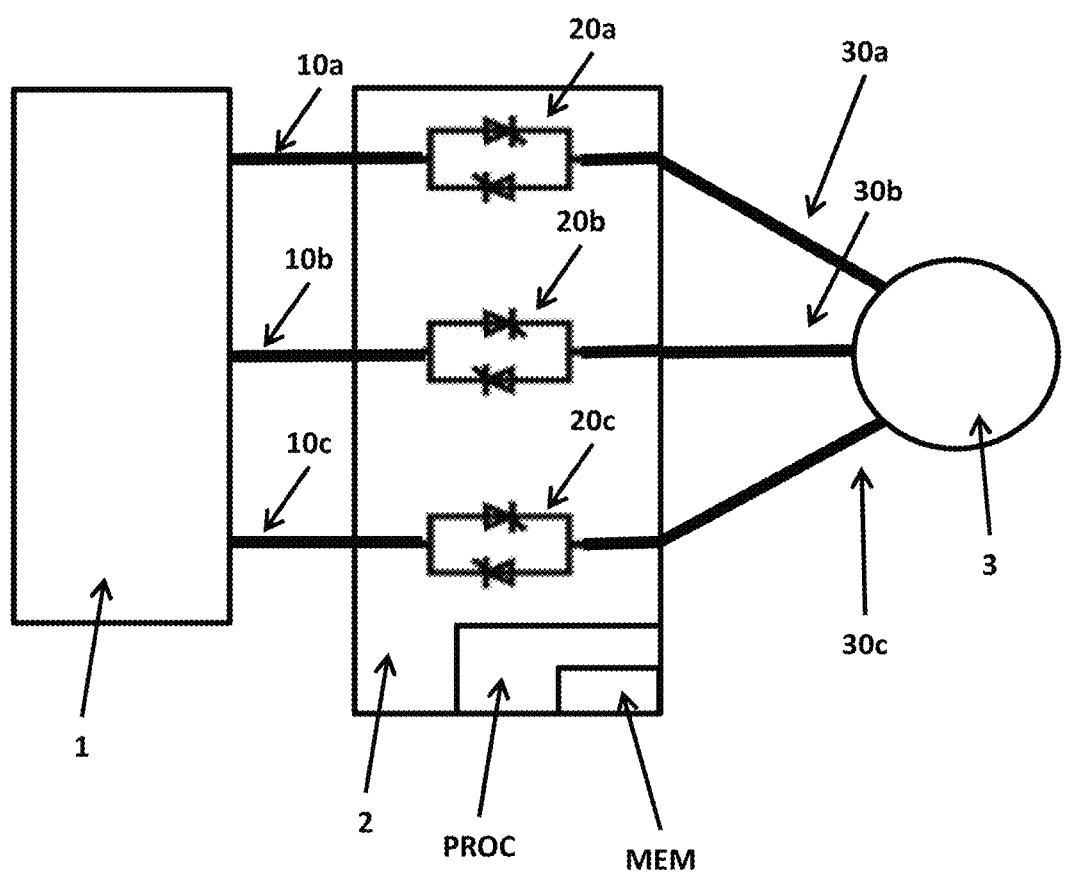
FIG. 1 illustrates an example of an electric circuit comprising a soft-starter for starting an electric motor.

The electric circuit of FIG. 1 comprises an electric motor 3 connected to an electric network 1 configured to apply an electric signal to the electric motor 3. The electric circuit also comprises a motor soft-starter 2 connected between the electric network 1 and the electric motor 3.

The electric network 1 may be a three-phases network designed to supply an electric signal, for example an alternating signal, in each of the windings of the electric motor. Each of the electric network phases 10a, 10b and 10c are respectively connected to an arm 20a, 20b and 20c of the motor soft-starter.

The motor soft-starter therefore comprises three arms 20a, 20b and 20c adapted to be respectively connected to three windings 30a, 30b, 30c of the electric motor 3 in one side and to the three phases 10a, 10b and 10c of the electric network on the other side.

Each atm 20 of the motor soft-starter comprises two thyristors in antiparallel configuration (head-to-tail) as illustrated by the FIG. 1. An arm 20 of the soft-starter may be considered as a controlled switch between a phase 10 of the electric network and a respective winding 30 of the electric motor. That is, by controlling the thyristors of an arm 20 of the motor soft-starter, one may control an electric signal passing from a phase of the electric network to a respective winding of the electric motor.

In some examples, the motor soft-starter may comprise a processor PROC, for example a controller or a microcontroller. The processor PROC may be configured to control the thyristors of each arm by controlling the supply of their respective gate with appropriate trigger pulses such that thyristors may switch from a blocking state to a passing state.

The processor PROC is configured to operate according to any of the methods hereby described. The processor PROC may comprise electronic circuits for computation managed by an operating system.

The motor soft-starter may also comprise a non-transitory machine-readable or computer readable storage medium, such as, for example, memory or storage unit MEM, whereby the non-transitory machine-readable storage medium is encoded with instructions executable by a processor such as processor PROC, the machine-readable storage medium comprising instructions to operate processor PROC to perform as per any of the example methods hereby described. A computer readable storage according to this disclosure may be any electronic, magnetic, optical or other physical storage device that stores executable instructions. The computer readable storage may be, for example, Random Access Memory (RAM), an Electrically Erasable Programmable Read Only Memory (EEPROM), a storage drive, and optical disk, and the like. As described hereby, the computer readable storage may be encoded with executable instructions according to the methods hereby described. Storage or memory may include any electronic, magnetic, optical or other physical storage device that stores executable instructions as described hereby.

The electric circuit of FIG. 1 may also comprise means for measuring a voltage in each phase of the electric network. The measuring means are, for example, voltmeters.

The electric circuit may also comprise means for measuring a current in phases of the electric network or in windings of the electric motor. The measuring means are, for example, ammeters.

Figure 2:
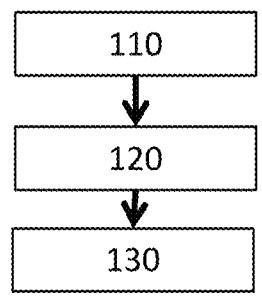
FIG. 2 illustrates an example method for controlling a motor soft-starter.

In reference to FIG. 2, the present disclosure will present an example method 100 for controlling a motor soft-starter.

As illustrated in bloc 110, the method comprises determining a misbalance between the three phases of the electric network.

In some examples, a misbalance between the three phases of the electric network may correspond to a misbalance between a reference phase and the two other phases.

In some examples, a misbalance between the three phases of the electric network may comprise one or more of a phase and an amplitude between the three phases of the electric network. In some examples, a misbalance between the three phases may comprise a voltage misbalance or a current misbalance.

The phase misbalance corresponds to the fact that an exact same dephasing of $2\pi/3$ may not be applied between each of the phase of the electric network.

The amplitude misbalance corresponds to the fact that the three phases of an electric network may not have the exact same amplitude of voltage and/or current in each of the phases.

Determining both phase and amplitude misbalance between two phases of the electric network in a period of the electric network may correspond to determine an electric signal misbalance between the phases of the electric network.

Hence, when actuating the gate of the thyristors of the motor soft-starter using a same firing angle across all three phases without taking an imbalance into account, at least one of the phase and/or the amplitude misbalance induces that an electric signal applied to the electric motor by each phase during the passing state of the conducting thyristors of the different phases is not equivalent, or not balanced, between the phases.

An angle in this description should be understood as corresponding to a specific time. The terminology angle is reflecting the fact that the electrical signals considered are sinusoidal signals. When mentioning a "zero-voltage angle", it should be understood that such angle corresponds to a specific time at which the voltage takes a zero value. When mentioning a "zero-current angle", it should be understood that such angle corresponds to a specific time at which the current takes a zero value. A firing angle corresponds to a specific time at which a thyristor is fired. The terminology "angle" reflects that such angle related times are periodical and that related actions get repeated periodically, i.e. repeated at each periodical cycle of the electrical signal considered.

In some examples, a current misbalance of the electric network may be estimated based on current measurements, for example ammeters measurements, in each of the windings of the electric motor.

Indeed, considering a perfect motor where the components of the electric motor are equilibrated between the three windings, an observed misbalance in the currents of the windings of the electric motor corresponds to a misbalance in the electric network.

In some examples, a current misbalance $M_I$ may be estimated based on root mean square currents (rms currents) of each winding of the electric motor. The rms currents may be estimated based on current measurements of the windings of the electric motor.

In some examples, a first rms current $I_{1rms}$, a second rms current $I_{2rms}$ and a third rms current $I_{3rms}$ may respectively be determined based on current measurements of a first winding 30a, a second winding 30b and a third winding 30c of the electric motor. A current misbalance may therefore be estimated between the first $I_{1rms}$, the second $I_{2rms}$ and the third $I_{3rms}$ rms currents.

One may for example determine a current misbalance between each of the phases of the electric network, and thereby determine a mean rms current $I_{mean}$. The mean rms current $I_{mean}$ may correspond to a mean value of the rms current in each of the three windings and may for example correspond to:

$$I_{mean} = \frac{I_{1rms} + I_{2rms} + I_{3rms}}{3}$$

In some examples, a current misbalance $M_I$ of a phase 10 may correspond to a difference between a rms current $I_{rms}$ in a corresponding winding 30 of the electric motor and a mean rms current $I_{mean}$ determined based on each of the rms currents ($I_{1rms}$, $I_{2rms}$, $I_{3rms}$) of the three windings 30 of the electric motor.

A current misbalance $M_{I1}$ between a first phase 10a of the electric network and the mean rms current $I_{mean}$ of the electric network may for example correspond to:

$$M_{I1} = I_{1rms} - I_{mean} = \tfrac{2}{3} I_{1rms} - \tfrac{1}{3}(I_{2rms} + I_{3rms})$$

A current misbalance $M_{I2}$ between a second phase 10b of the electric network and the mean rms current $I_{mean}$ of the electric network may for example correspond to:

$$M_{I2} = I_{2rms} - I_{mean} = \tfrac{2}{3} I_{2rms} - \tfrac{1}{3}(I_{1rms} + I_{3rms})$$

A current misbalance MB between a third phase 10c of the electric network and the mean rms current $I_{mean}$ of the electric network may for example correspond to:

$$M_{I3} = I_{3rms} - I_{mean} = \tfrac{2}{3} I_{3rms} - \tfrac{1}{3}(I_{1rms} + I_{2rms})$$

The current misbalance $M_I$ between the respective phases 10 may be expressed in ampere (A).

In some examples, a current misbalance $M_I$ of a phase 10 may correspond to a difference between a rms current $I_{rms}$ of the corresponding phase and another rms current $I_{rms}$ of another corresponding phase.

In some examples, a voltage misbalance $M_v$ may be estimated based on voltage measurements, for example voltmeters measurements, in each of the phases of the electric network.

In some examples, a model of a voltage of the electric network characterizing a voltage misbalance may be estimated based on the voltage measurements.

In particular, a model of a voltage of the electric network may comprise a direct component $V_d$ and an inverse voltage component $V_i$.

In some examples, a model of a voltage of the electric network may be expressed as following:

$$V = V_d e^{j\omega t} + V_i e^{-j\omega t}$$

Where V is a model of the voltages on the electric network, $V_d$ is the direct voltage component and $V_i$ is the inverse voltage component.

In a perfect electric network, the inverse voltage component $V_i$ is equal to 0. The inverse voltage component $V_i$ may therefore characterize a voltage misbalance on the electric network. The inverse voltage component $V_i$ may for example be expressed as a percentage of the direct voltage component $V_d$.

An example of a voltage misbalance $M_v$ may correspond to a ratio between the inverse voltage component and the direct voltage component:

$$M_v = \frac{V_i}{V_d}$$

where $M_v$ is the voltage misbalance, $V_i$ is the inverse voltage component and $V_d$ is the direct voltage component.

In some examples, the voltage misbalance allows determining a voltage signal of each of the three phases of the electric network.

In some examples, a first voltage signal $V_a$ may correspond to:

$$V_a = Re(V) = Re(V_d e^{j\omega t} + V_i e^{-j\omega t}),$$

In some examples, a second voltage signal $V_b$ may correspond to:

$$V_b = Re(V e^{-j\frac{2\pi}{3}}) = Re\big((V_d e^{j\omega t} + V_i e^{-j\omega t}) e^{-j\frac{2\pi}{3}}\big),$$

In some examples, a third voltage signal $V_c$ may correspond to:

$$V_c = Re(V e^{-j\frac{4\pi}{3}}) = Re\big((V_d e^{j\omega t} + V_i e^{-j\omega t}) e^{-j\frac{4\pi}{3}}\big).$$

where Re(X) corresponds to the real part of the complex X.

Figure 4:
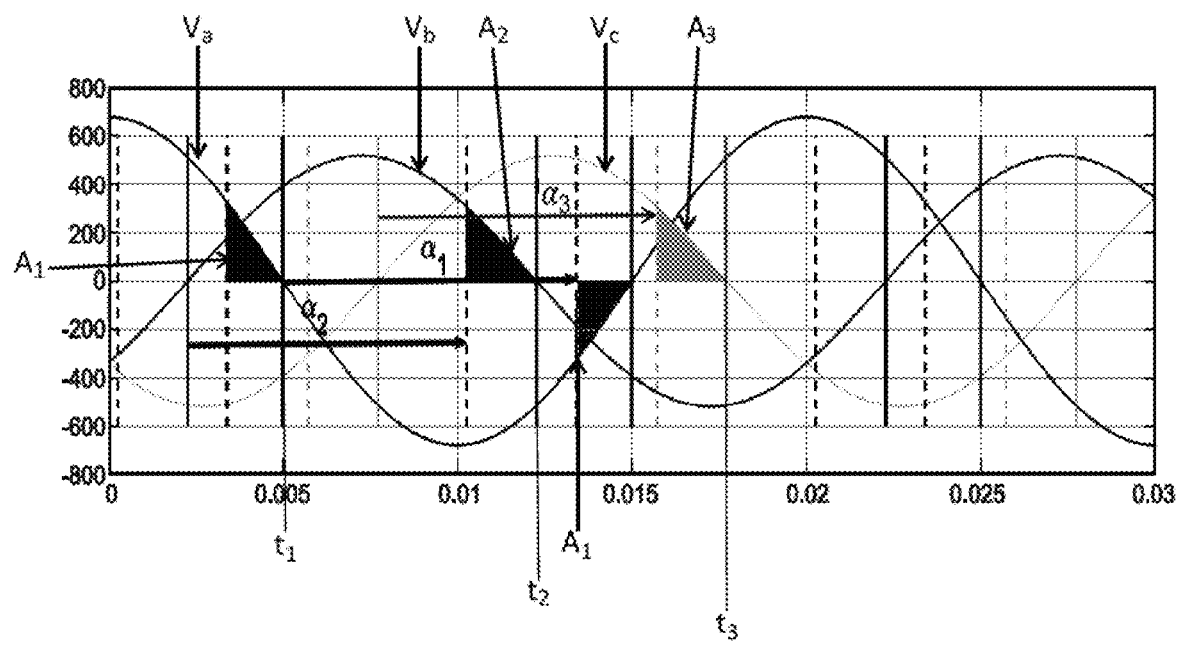
FIG. 4 illustrates an example of voltage signals in an electric network.

Based on the first $V_a$, second $V_b$ and third $V_c$ voltage signals above, one may determine a time t of a period associated to a voltage signal wherein the voltage signal crosses the zero voltage (i.e. a respective time t for which $V_a$, $V_b$ and $V_c$=0). One may therefore determine a phase misbalance between each of the phase of the electric network based on the respective times t. A first time $t_1$, a second time $t_2$ and a third time $t_3$ respectively associated to the first voltage signal $V_a$, second voltage signal $V_b$ and third voltage signals voltage signal $V_c$ are illustrated by FIG. 4.

Still based on the first $V_a$, second $V_b$ and third $V_c$ voltage signals above, one may determine an amplitude misbalance for example by finding a minimum and a maximum of the first voltage signal $V_a$, second voltage signal $V_b$ and third voltage signal $V_c$ in a period of the electric network. Then, by comparing one or more of a respective minimum and a respective maximum of the voltage signals $V_a$, $V_b$ and $V_c$ between the voltage signals, an amplitude misbalance may be determined.

As illustrated in bloc 120, the method comprises computing a first firing angle for the thyristors of a first arm of the three arms based on a misbalance between the phases.

In some examples, a thyristor may be controlled based on an α command, that is, by supplying the gate of a thyristor with a delay corresponding to an angle α and following an angle where the phase voltage of the electric network becomes equal to zero (zero-voltage angle) from a positive phase or from a negative phase. The angle α associated to a thyristor of an arm is calculated starting from a zero-voltage angle following a positive phase of the voltage while the other angle α associated to the other thyristor of the arm is calculated starting from a zero-voltage angle following a negative phase of the current.

The first firing angle may therefore correspond to an angle $α_1$ following a zero-voltage angle of the corresponding first phase 10a of the electric network.

In some examples, a thyristor may be controlled based on a γ command, that is, by supplying the gate of the thyristor with a delay corresponding to an angle γ and following an angle where the phase current of the electric network becomes equal to zero (zero-current angle) from a positive phase or from a negative phase. The angle γ associated to a thyristor of an arm starts from a zero-current angle following a positive phase of the current while the other angle γ associated to the other thyristor of the arm starts from a zero-current angle following a negative phase of the current.

The first firing angle may therefore correspond to an angle $γ_1$ following a zero-current angle of the corresponding first phase 10a of the electric network.

The first firing angle determined based on a misbalance between the phases of the electric network aims at reducing the misbalance between the phases of the electric network. This allows reducing torque ripple and premature aging of the electric motor while having a better thermal repartition in the windings of the electric motor.

In some examples, the first firing angle $(α_1, γ_1)$ may be computed based on a reference firing angle $(α_r, γ_r)$, corresponding to a firing angle of at least one of the other arms (20b, 20c), and on a misbalance between the phase (10b, 10c) of the arm (20b, 20c) associated to the reference firing angle $(α_r, γ_r)$ and the corresponding phase 10a of the electric network associated to the arm (10a) of the first firing angle $(α_1, γ_1)$.

The reference firing angle $(α_r, γ_r)$ may for example be determined based on current measurements in the motor in order to progressively raise or to limit the current in the electric motor. The reference firing angle $(α_r, γ_r)$ may for example be determined based on an estimated torque in the electric motor in order to reach a targeted torque or in order to limit the torque in the electric motor.

The reference firing angle $(α_r, γ_r)$ may not necessarily be associated to an arm 20 but may constitute a base for determining a specific firing angle adapted to each arm 20 based on a ratio of the reference firing angle $(α_r, γ_r)$ in order to equilibrate the respective electric signals passing through the arms 20 in a period of the electric network.

In some examples, the first firing angle $(α_1, γ_1)$ may be computed such that an electric signal transmitted to the motor in a half-period or a full period by the first arm (10a) may be substantially equal to an electric signal transmitted by the arm (10b, 10c) of the reference angle $(α_r, γ_r)$ in a respective half-period or a full period of the electric network.

In some examples, the first firing angle $(α_1, γ_1)$ may be computed such that a current applied to the electric motor by the first arm 20a is significantly the same as a current applied by another arm during a half-period or a full period of the electric network. In some examples, one may compute an adapted first firing angle $(α_1, γ_1)$ of a specific arm of the motor soft-starter such that a difference between a current applied by the specific arm and a current applied by another arm is below a predetermined threshold. Such predetermined threshold may for example be comprised between 0.2% and 1% of the current applied by the other arm. Such predetermined threshold may for example be 0.5% of the current applied by the other arm.

In such example, the first firing angle $(α_1, γ_1)$ may be computed based on a feedback of the first $I_1$rms, second $I_2$rms and third $I_3$rms rms currents representing an amplitude misbalance between the phases.

Figure 3:
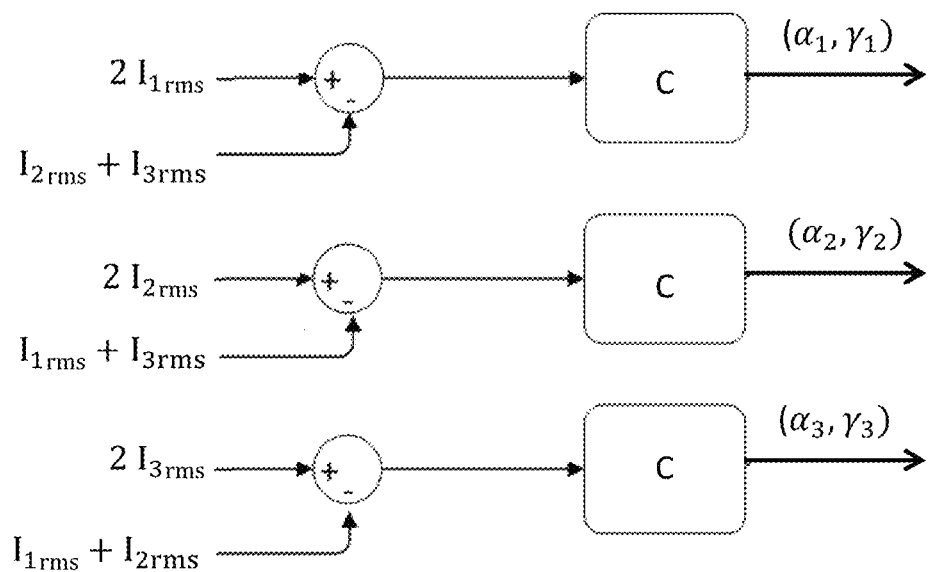
FIG. 3 illustrates an example for compensating a misbalance of the currents.

Such a feedback is illustrated in FIG. 3 where a controller C, for example the processor PROC, may compute a first firing angle $(α_1, γ_1)$ to regulate the current in the first phase 10a of the electric network to the mean value $I_{mean}$ of the rms currents of the three windings of the electric motor. The regulation is therefore based on estimation of the rms currents in the windings of the electric motor.

In some example, one may determine a ratio between a reference angle $(α_r, γ_r)$ and the first firing angle $(α_1, γ_1)$ to be determined to compensate a difference between a reference rms current in the winding of the electric motor connected to the thyristors associated to the reference angle $(α_r, γ_1)$ and the rms current of the winding connected to the thyristors of the first firing angle $(α_1, γ_1)$ to be determined.

As represented in the FIG. 3, a second firing angle $(α_2, γ_2)$ and a third firing angle $(α_3, γ_3)$ may also be computed by a controller C based on the first $I_{1rms}$, second $I_{2rms}$ and third $I_{3rms}$ rms currents such that a current on the second 10b and third 10c phases of the electric network may also be regulated to the mean value $I_{mean}$ of the rms currents of the three windings of the electric motor. In such case, the currents passing to each of the windings of the electric motor are substantially the same at each half or full period of the electric network and therefore, the misbalance between the windings of the electric motor is compensated. In this example, each arm may have its own specific firing angle determined based on a respective ratio of a reference firing angle, the reference firing angle here being not associated to a specific arm. In this example, the firing angles may be computed such that a difference of the first $I_{1rms}$, second $I_{2rms}$ and third $I_{3rms}$ rms currents between the windings of the electric motor is below a predetermined threshold. Such predetermined threshold may for example be comprised between 0.2% and 1% of the mean rms current $I_{mean}$.

One should note that computing firing angles at each half-period of the electric network allows controlling differently each thyristor of the both thyristors of each arm and compensating the misbalance between each half-period of the electric network.

In some examples, the first firing angle may be computed such that a voltage applied to the electric motor by the first arm 20a is significantly the same as a voltage applied by the two other arms (20b, 20c) of the electric network. The first firing angle may be computed such that a difference between the voltage applied to the electric motor by the first arm 20a and a voltage applied to the electric motor by another arm (20b, 20c) is below a predetermined threshold. Such predetermined threshold may for example be comprised between 1% and 5% of the voltage applied by the other arm during a half or a full period of the electric network.

A first firing angle may therefore be computed based on integrals of the voltage signals $V_a$, $V_b$ and $V_c$.

In some examples, a first integral of a first voltage signal $V_a$ between the first firing angle and a first zero-crossing voltage $t_1$ may be equal to an equivalent integral of at least one other voltage signals $V_b$ and $V_c$. At least one of the other voltage signals may be considered as a reference voltage signal with an associated reference firing angle.

Voltage signals representing an example of a three-phases voltages of an electric network are represented in FIG. 4. A first voltage signal $V_a$, a second voltage signal $V_b$ and a third voltage $V_c$ respectively associated to a first 10a, a second 10b and a third 10c voltage phase of an electric network are represented. A first integral. $A_1$ is represented in the FIG. 4 for both positive and negative phases of the first voltage signal $V_a$. A second integral $A_2$ is represented for a positive phase of the second voltage signal $V_b$. A third integral $A_3$ is represented for a positive phase of the third voltage signal $V_c$.

The first integral $A_1$ of the first voltage signal $V_a$ may therefore correspond to an area of the first voltage signal between the first firing angle $\alpha_1$ and the first time $t_1$ corresponding to a zero-crossing voltage of a first voltage signal $V_a$.

The first integral $A_1$ may therefore correspond to:

$$A_1 = \int_{\alpha_1 - t_1}^{t_1} V_a(\theta) d\theta$$

A second integral $A_2$ of the second voltage signal $V_b$ may therefore correspond to an area of the second voltage signal between the second firing angle $\alpha_2$ and the second time $t_2$ corresponding to a zero-crossing voltage of a second voltage signal $V_b$.

A second integral $A_2$ may therefore correspond to:

$$A_2 = \int_{\alpha_2 - t_2}^{t_2} V_b(\theta) d\theta$$

A third integral $A_3$ of the third voltage signal $V_c$ may therefore correspond to an area of the third voltage signal between the third firing angle $\alpha_3$ and the third time $t_3$ corresponding to a zero-crossing voltage of a second voltage signal $V_c$.

The third integral $A_3$ may therefore correspond to:

$$A_3 = \int_{\alpha_3 - t_3}^{t_3} V_c(\theta) d\theta$$

Hence, one may determine an adapted firing angle $\alpha$ of a specific arm of the motor soft-starter such that the integral $A_s$ of its voltage signal is equal to the integral $A_o$ of a voltage signal of another arm. In some examples, one may determine an adapted firing angle $\alpha$ of a specific arm of the motor soft-starter such that a difference between the integral $A_s$ of its voltage signal and the integral $A_o$ of a voltage signal of another arm is below a predetermined threshold. Such predetermined threshold may for example be 1% of $A_s$. Such predetermined threshold may for example be 0.5% of $A_s$.

In some examples, a reference firing angle ($\alpha_r$) associated to an arm may be determined.

Hence, a reference integral of a voltage signal $V_r$ associated to a phase of the electric network may be computed as following:

$$A_r = \int_{\alpha_r - t_r}^{t_r} V_r(\theta) d\theta$$

Then, the two other firing angles, for example $\alpha_1$ and $\alpha_2$ may be computed such that their respective associated integral $A_1$ and $A_2$ are substantially equal to $A_r$.

As illustrated in bloc 130, the method 100 comprises applying a trigger pulse on a specific thyristor of the first arm at the first firing angle.

The trigger pulse is the pulse sent to the gate of the thyristor and allowing a thyristor to switch from a blocking state to a passing state. The trigger pulse may for example be controlled by the processor PROC.

In some examples, the specific thyristor of the first arm may be determined based on a sign of the current. More precisely, the specific thyristor may correspond to the one which will directly pass the electric signal of the network when receiving the trigger pulse.

In some examples, both thyristors of the first arm may receive a trigger pulse at the first firing angle but since one of them acts as a diode in view of the sign of the current, the electric signal will not be passing through the thyristor.

Other trigger pulses may be applied to the thyristors of the other arms at their respective firing angle. As presented above, one may compute a firing angle for the thyristors of each of the arms such that when applying a trigger pulse at each respective firing angle, the misbalance of the electric network is compensated.

Hence, computing a personalized firing angle for each arm of the soft-starter based on a misbalance of the electric network leads to compensate the misbalance by transmitting a same or similar electric signal between each winding of the electric motor. Moreover, computing one firing angle based on a misbalance of the electric network, if not completely compensating the misbalance, at least allows reducing the misbalance even if the other firing angles are not determined based on the misbalance. Reducing or compensating the misbalance between the phases of the electric network allows, among other things, reducing a thermal impact of the motor, reducing a torque ripple and preserving the electric motor from premature aging. This also allows improving the effects produced by a classic control of the soft-starter by reducing the inrush currents or smoothly starting the motor.

The invention claimed is:

1. A method for controlling a motor soft-starter for starting an electric motor on a three-phases electric network, the soft starter comprising three arms, each arm comprising two thyristors in antiparallel configuration and each arm connecting a respective phase of the electric network to a respective winding of the electric motor, the method comprising:

determining, during a startup phase of the motor soft-starter, an amplitude misbalance between the three phases of the electric network, wherein the amplitude misbalance occurs when the three phases of the electric network do not all have the same amplitude of voltage and/or current;

computing a first firing angle for the thyristors of a first arm of the three arms based on the determined amplitude misbalance between the three phases; and applying, during the startup phase of the motor soft-starter, a trigger pulse on a specific thyristor of the first arm at the first computed firing angle with a capability to both increase and decrease an amplitude of voltage or current output by the first arm to a respective winding of the electric motor.

2. The method according to claim 1 further comprising determining a phase misbalance between the three phases of the electric network, wherein the phase misbalance occurs when a same dephasing is not applied between the three phases of the electric network, and the first firing angle is further computed based on the determined phase misbalance between the three phases or the first firing angle is computed not based on the determined phase balance between the three phases.

3. The method according to claim 2 wherein a second firing angle is computed for the thyristors of a second arm and a third firing angle is computed for the thyristors of a third arm of the soft-starter, at least two of the first, second, and third firing angles being computed based on the amplitude misbalance between the three phases and/or the phase misbalance between the three phases.

4. The method according to claim 3 wherein each of the first, second and third firing angles are computed such that an integral of a voltage signal applied from each of the respective arms of the soft-starter to each of the respective windings of the electric motor is substantially equal across the three arms.

5. The method according to claim 2 wherein the firing angle corresponds to an angle delay from an angle where the current or the voltage of the electric network becomes equal to zero.

6. The method according to claim 2 wherein the amplitude or phase misbalance comprises a voltage misbalance between the three phases of the electric network whereby the voltage misbalance is estimated based on voltage measurements on each of the three-phases of the electric network.

7. The method according to claim 1 wherein computing the first firing angle for the thyristors of the first arm based on the amplitude misbalance of the three phases comprises computing the first firing angle such that a current applied to the electric motor by the first arm is significantly the same as a current applied by at least another arm during a half period of the electric network.

8. The method according to claim 1 wherein the trigger pulse is also applied to the other thyristor of the first arm at the first firing angle.

9. The method according to claim 1 wherein the first firing angle is also computed based on an estimated torque of the electric motor.

10. The method according to claim 1 wherein the first firing angle is also computed based on an estimated current of the electric motor.

11. The method according to claim 1 wherein the specific thyristor of the first arm is determined based on a sign of a current of the electric network.

12. The method according to claim 1 wherein the amplitude or phase misbalance comprises a current misbalance between the three windings of the electric motor, whereby the current misbalance is estimated based on current measurements on each of the phases of the electric network.

13. The method according to claim 12 wherein the current misbalance is determined based on a root mean square current of each of the three phases.

14. A non-transitory computer-readable storage medium comprising instructions which, when executed by a processor, cause the processor to carry out the method of claim 1.

15. A motor soft-starter comprising a processor adapted to control an electric motor according to the method of claim 1.

16. The method of claim 1, wherein the first firing angle is computed as a function of amplitude of measured voltage and/or current output to at least two arms of the three arms.

* * * * *